United States Patent [19]

Sommerville et al.

[11] Patent Number: 4,940,486
[45] Date of Patent: Jul. 10, 1990

[54] PROCESS FOR TREATING LIQUID METALS

[75] Inventors: Iain D. Sommerville, Oakville; Francis L. Kemeny, Pickering, both of Canada

[73] Assignee: The University of Toronto Innovations Foundation, Canada

[21] Appl. No.: 348,857

[22] Filed: May 8, 1989

Related U.S. Application Data

[63] Continuation-in-part of Ser. No. 54,341, May 26, 1987.

[51] Int. Cl.$^5$ ................................................ C22B 4/00
[52] U.S. Cl. ............................. 75/10.19; 219/121.37; 373/1.9
[58] Field of Search ...................... 75/10.19; 373/1, 9; 219/121 P

[56] References Cited

U.S. PATENT DOCUMENTS 3,347,766 10/1967 Death ................................. 75/10.19
3,671,655 6/1972 Adachi ..................................... 373/9
4,061,493 12/1977 Jaeger ............................... 75/10.19

Primary Examiner—Peter D. Rosenberg
Attorney, Agent, or Firm—Andrus, Sceales, Starke & Sawall

[57] ABSTRACT

A process for treating metal comprises applying a positive DC potential to an ionic melt layer disposed on the surface of a liquid metal. The application of this potential provides a plasma phase above the ionic melt layer and induces a flow of electrons from the liquid metal towards the plasma phase. The ionic melt layer is capable of being maintained in a liquid state when it is in contact with the liquid metal. The process can be used either to remove impurities from the liquid metal, to alloy the liquid metal by adding metal compounds in the ionic melt layer, to recover metals from waste, or to perform a combination of these functions. An apparatus for treating liquid metals is also provided.

15 Claims, 2 Drawing Sheets

PROCESS FOR TREATING LIQUID METALS

RELATED APPLICATION

This is a continuation-in-part application of Ser. No. 07/054,341, filed May 26, 1987, entitled Process For Treating Liquid Metals.

The present invention relates to processes for treating metals which are in a liquid state and more particularly to electrolytic processes for refining and/or alloying such metals.

BACKGROUND OF THE INVENTION

Current trends indicate an increasing demand worldwide for high quality, low residual content metals. In one conventional method, a metal, particularly steel, may be refined in a furnace by providing the metal in a liquid state and adding molten slag thereto. Impurities in the metal are thereby chemically reduced and retained in the molten slag. The amount of impurities removed from the slag and the rate of removal is primarily limited by the amount of slag used and the capacity of the slag for the impurities.

M.G. Frohberg, M.L. Kapoor, and A. Nilas in the article entitled "Review Paper: Desulphurization", *J.I.S.I.*, Feb. 1965, pp. 139–182 suggest using methods such as mechanical stirring and adjustment of the oxygen potential to improve the removal of sulphur from steel.

In the article "The Kinetics of Sulphur Transfer from Iron to Slag", R.G. Ward and K.A. Salmon, *J.I.S.I.*, Dec. 1960, pp. 393–402, the electrolytic nature of sulphur transfer is discussed. In another article by the same workers, "The Kinetics of Sulphur transfer from Iron to Slag", *J.I.S.I.*, Mar. 1963, pp. 222–227, the use of electrolytic methods to enhance sulphur removal using a current density below which arcing occurs is investigated. It was concluded that the process was too inefficient to be commercially attractive.

It is known to refine certain metals using solely an electrolytic process. However, a very large amount of electricity must be used which often renders this process prohibitively expensive. It is also known to refine certain metals in their molten state by reacting them with a second phase, such as slag. Accordingly, it would be desirable to have a process whereby the two above-mentioned technologies could be economically combined.

Alloying of liquid metals conventionally requires the separate step of converting the oxides of the alloy to be added into a reduced form of the alloy which can then be added to the liquid metal. In the case of chromium alloys for steel, the chromium oxide must be converted to ferrochromium. This process tends to be very expensive. Accordingly, it would be desirable to have a process whereby the oxides of the alloy could be converted to their reduced form in a relatively simple and economical manner.

It is an object of the present invention to obviate or mitigate the above-mentioned disadvantages.

SUMMARY OF THE INVENTION

Accordingly, in one of its aspects, the present invention provides a process for treating metal which comprises applying a positive DC potential to an ionic melt or slag layer disposed on the surface of a liquid metal, thereby 1) providing a plasma phase above the ionic melt layer and ii) inducing the flow of electrons from the liquid metal towards the plasma phase; wherein the ionic melt layer is capable of being maintained in a liquid state when it is in contact with the liquid metal.

In another of its aspects, the invention provides an apparatus for treating liquid metals, the apparatus comprising: a container for holding liquid metal; a DC power supply; and a positive polarity DC electrode electrically connected to said power supply and disposed in an upper portion of said container.

In one of its embodiments, the present invention may be used to refine or purify a metal while the metal is in a liquid state. It is believed that with the present invention, the induced potential creates a charge neutrality with electron flow through the ionic melt or slag layer from the liquid metal/slag interface to the slag/plasma interface. Thus at the liquid metal/slag interface, reduction of dissolved impurities in the liquid metal occurs, causing these impurities in the ionic state to migrate through the ionic melt or slag layer to the slag/plasma interface. At the slag/plasma interface, these impurities in the ionic state are oxidized to a non-ionized state or gaseous form and escape into the surrounding atmosphere.

Oxidation of the impurities at the slag/plasma interface may be enhanced by the addition of suitable compounds to the plasma phase — for example oxygen may be added to enhance the removal of sulphur in the form of sulphur dioxide. Thus, the ionic melt or slag layer acts as a pump to remove impurities from the liquid metal rather than as a reservoir for impurities. Impurities can therefore be substantially completely removed from the liquid metal. The rate of removal is in part limited by the rate of escape of the impurities into the atmosphere above the slag, which is dependent on the current density. Thus, in this embodiment of the invention, a metal may be refined by plasma-enhanced electrolytic reduction of impurities contained in the metal.

In another embodiment of the present invention, metals can be alloyed or combined with the liquid metal by adding a metallic compound, such as metal oxides, directly to the ionic melt layer. The induced potential causes the positive metal ions of the metal compounds to migrate to the liquid metal/slag interface where they are reduced to their elemental state and combined with the liquid metal. By adding an oxide of a metal different from the metal of the melt, an alloy will result, while adding an oxide of the same metal as the melt will result in the generation of additional quantities of the basic metal.

The process may be enhanced by addition of suitable compounds to the plasma phase — for example carbon monoxide may be added to the plasma phase to enhance the removal of oxygen in the form of carbon dioxide. This allows relatively common and inexpensive metal compounds to be alloyed or added to the liquid metal in situ rather than first having to be transformed into a reduced form by a relatively expensive separate process.

The ionic melt or slag layer has a melting point such that it is in a liquid state at the process temperature and is sufficiently conductive to allow electron transfer from the liquid metal to the plasma phase upon application of the DC potential.

The present invention thus may be used to enhance the removal of impurities from the metal and enhance alloying by providing favorable migrations of the components toward the various interfaces and by augmenting the desired oxidations and reductions at the interfaces. Moreover, the intense localized heat provided by the plasma phase during process of the present invention acts to accelerate the rate of reaction.

In the case of steel refining, the reactions taking place at the liquid metal/slag interface may include the reduction of impurities in the liquid metal such as:

$$S + 2e \rightarrow (S^{2-})$$

$$O + 2e \rightarrow (O^{2-})$$

Recovery of metal cations from the ionic melt or slag phase may include the following reactions:

$$(Fe^{2+}) + 2e \rightarrow Fe$$

$$(Mn^{2+}) + 2e \rightarrow Mn$$

$$(Cr^{2+}) + 3e \rightarrow Cr$$

The brackets represent components in the slag layer, while the underlined components are dissolved in the liquid metal layer.

The process of the present invention is preferably used to treat a metal selected from the group comprising steel, iron, copper, titanium, zirconium, hafnium, tantalum, lanthanum, silicon, nickel and alloys thereof. The invention is particularly suitable for use with metals having a melting point (at atmospheric pressure) of above 800° C., preferably above about 1100° C., and can also be used with lower melting point metals if a low melting point slag layer is employed.

The invention can be used to remove electrolytically reducible impurities from metals. Preferably, the invention can be carried out to remove Group VI impurities, such as sulphur and oxygen, and Group V impurities such as nitrogen and phosphorous from steel; Group VI impurities such as sulphur, and Group V impurities such as phosphorous, arsenic, antimony and bismuth from copper; oxygen, sulphur and nitrogen from titanium; and oxygen and sulphur from nickel.

Also, the invention can be used to alloy liquid metals by adding metal compounds such as metal oxides into the ionic melt or slag layer. For example, the invention can be used to alloy steel by adding oxides of chromium, nickel, cobalt, manganese, silicon, niobium, molybdenum and tungsten to the ionic melt phase. The invention may also be used to alloy copper titanium and nickel. Moreover, the invention may be used to alloy "ferroalloys" which are alloys themselves comprising iron and a metal selected from the group comprising chromium, vanadium, niobium, titanium, silicon, manganese, tungsten, cobalt, molybdenum, and nickel. In this embodiment, the invention is particularly suitable for use with (i) metal, or (ii) alloys comprising a metal having a melting point (at atmospheric pressure) above 800° C., preferably above 1100° C. The metal compounds are added to the ionic melt layer, or in some situations may constitute this layer.

In another embodiment, the invention may also find applicability in the recovery of a metal, such as zinc, lead, iron, chromium, manganese, silicon and nickel from waste oxides such as mill scale, flyash, baghouse dust and AOD dust. These metal oxides are reduced to elemental form at the liquid metal/ionic melt interface. Alternatively, the invention may be used to recover these metals in a smelting process.

The ionic melt or slag layer used for a given metal is generally of a composition similar to the ionic melt layer used in conventional metal refining processes. Generally, it is desirable that the ionic melt layer have a melting point moderately below the process temperature such that the ionic melt layer is capable of being maintained in a molten state while in contact with the liquid metal. Moreover, the ionic melt layer should be sufficiently conductive to allow transfer of charge. The ionic melt layer is preferably provided in an amount sufficient to completely cover the entire surface of the liquid metal.

It is preferred to use an ionic melt or slag layer comprising a mixture of oxides that are stable relative to the metal being refined and/or alloyed. For example, the oxides can take the form of alkali metal oxides, such as sodium, potassium or lithium; alkaline earth metal oxides, such as barium, magnesium or calcium; acid oxides such as aluminum oxide; and alkali metal and alkaline earth metal fluorides.

It is advantageous to select a slag constitutent that will not cause "alloying" from the slag, when the objective of the process is to remove impurities from the melt.

The composition of the slag layer for refining is not as critical in the present invention as in conventional processes, since the capacity of the slag layer for the impurities does not limit the amount of impurities that are removed from the liquid metal. For example, for removal of impurities from steel, a low basicity or acidic slag can be used, which would not be effective in removing sulphur in conventional processes.

The current density in the vicinity of the electrode should be high enough to create a plasma. The current density required depends on several factors and can be readily determined experimentally by one skilled in the art.

The average current density applied should be sufficiently high that the process proceeds at a commercially feasible rate. Generally, standard refining processes are carried out for 5–20 minutes. Thus, the average current density is preferably at least 0.7 amps/cm². For small scale experimental furnaces, an average current density of 0.7 amps/cm² is satisfactory, whereas with large scale furnaces, an average current density between 1.0–1.2 amps/cm² is preferably used. These current densities should generally be regarded as minimums. The higher the current density, the faster the process operates. The upper limit on current density is determined by cost and equipment limitations. For alloying, the current density is selected on the basis of the ease of reducing the alloy being used from a kinetic point of view. If removal of impurities and alloying are taking place simultaneously, the current density may need to be higher as each function will use part of the current.

The gas used with the electrode to create the plasma phase should be relatively inert with respect to the electrode and should stabilize the arc. Preferably, the gas is argon. The plasma phase is preferably maintained at atmospheric pressure. In the case of a sealed container, the pressure is preferably just above atmospheric to inhibit seepage of ambient air into the container.

The slag layer has charged neutrality, meaning that for every electron used at the liquid metal/slag interface for the reduction reaction, the same number of electrons are used in the oxidation reaction at the slag/plasma interface. When impurities, other than oxygen, are to be removed from the liquid metal, oxygen may advantageously be added to the vicinity of the plasma which will react with the ion species being released at the slag/plasma interface. When the objective of the process is alloying, and metal oxides are included in the slag layer, a reducing gas, such as carbon monoxide or hydrogen, can be introduced to the plasma phase to react with the oxygen species being released at the slag/plasma interface. In either case, the addition of the gas to the vicinity of the plasma will result in the reduction reaction at the liquid metal/slag interface being rate controlling.

The metal in its liquid state is preferably agitated during the purification process disclosed herein. The more preferred methods of agitating the liquid metal include (i) induction and (ii) agitation by bubbling gas through the liquid metal, both of which are known to those skilled n the art.

The process can operated in either batch or continuous mode. When operating in the continuous mode, the ionic melt and plasma phases are preferably contined in a vessel and the liquid metal flows through the vessel underneath.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
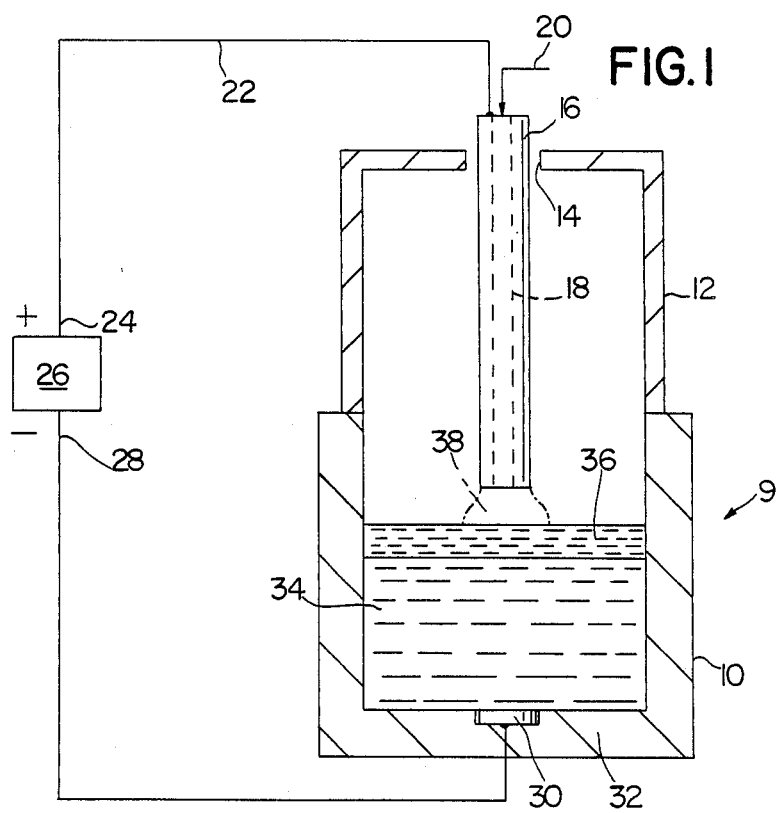
FIG. 1 is a diagrammatic cross-section of a furnace assembly for treating liquid metal.

As can be seen in FIG. 1, a furnace assembly 9 comprises a container 10 having a roof 12. An opening 14 in the roof 12 is provided to receive an electrode 16 which extends downwardly toward the container 10. This electrode has an axial bore 18 extending through the center thereof through which plasma-supporting gas can be injected through inlet 20. This electrode is connected by a wire 22 to the positive end 24 of a DC power supply 26. The negative end 28 of the power supply is connected to a cathode 30 at the base 32 of the container 10.

In operation, liquid metal 34 is introduced into the container 10 and a suitable compound is added thereto to form an ionic melt or slag layer 36 which covers the entire surface of the liquid metal.

The metal 34 can be heated to the liquid state in container 10 by an induction heating coil, not shown, which surrounds the container. The slag layer 36 is then heated by DC plasma arc heating via the power supply 26 to a temperature above the melting point of the melt 34, and generally above 800° C., to provide a molten slag layer. In heating the slag, negative polarity is preferably employed in which the electrode 16 is cathodic and melt 34 is anodic. After the slag layer is molten, the polarity is reversed to carry out the refining or alloying process. An inert gas, such as argon, is passed axially through the hollow electrode 16 to provide a plasma phase 38 above the slag layer 36, and a gas, capable of reacting with the ion species being released at the slag/plasma interface, can be introduced into container 10 through line 40.

Variations can be made to the preferred embodiment of the apparatus within the scope of the invention as described and claimed. The electrode 16 could be a graphite electrode, a plasma torch or any other type of electrode capable of sustaining an electric arc or plasma. Preferably a graphite electrode of the type disclosed in U.S. Pat. No. 4,037,043, issued July 19, 1977, the contents of which are incorporated herein by reference, is used Alternatively, a plasma torch of the type disclosed in U.S. Pat. No. 3,749,802, issued 1973, the contents of which are incorporated herein by reference, may be used. The container 10 can be electrically conducting, so that the cathode 30 is not necessary to complete the circuit. Also, the roof 12 may not be necessary if ambient atmosphere and ambient pressure suffices to provide the desired results In some circumstances, such as desulphurization of liquid metal, the off gases should not be allowed to escape into the atmosphere but rather into a gas collection system.

The invention will now be further described, by way of illustration only, with reference to the following examples.

EXAMPLE I

A furnace assembly similar to that of FIG. 1 was used. The furnace was lined with 98% MgO ramming compound. The inside diameter of the lined furnace was 11.4 cm and a maximum heat size of 8 kg could be accommodated. A thyristor invertor was used to provide 30 kw of power at a freqeuncy range of about 2500–4000 Hz to an induction coil located on the outside of the container. The furnace roof was water-cooled and constructed of austenitic stainless steel to minimize heating by stray field from the induction coil. A 22 mm diameter graphite electrode was admitted through a hole in the center of the roof. The electrode was insulated from the supporting structure by a composite sleeve made of refractory paper and high temperature silicon rubber. Clearance between the electrode and the sleeve was about 0 5 mm to allow axial movement of the electrode. The electrode was raised and lowered by a crank and gear arrangement.

A 6 mm axial hole was drilled through the length of the electrode. The top end of the electrode was threaded to accommodate a copper pipe gas inlet. The bottom was drilled out and threaded to allow insertion of a consumable graphite electrode tip. These tips are 100 mm long and 13 mm in diameter, threaded at one end, with a 2 mm diameter hole drilled axially therethrough. The electrode tips were replaced before they wear down to within 10 mm of the electrode end. These small diameter tips create a higher current density and thus better plasma stability.

Plasma-forming gases, such as argon, were injected through the hole in the electrode. The electrode was held by a water-cooled aluminum clamp to which the electrical connection is made. The return pass of the current was via a cathode consisting of a 19 mm stainless steel pin protruding from a water-cooled copper block embedded in a magnesia-chromate plastic refractory at the base of the container.

A 15 cm diameter sealable port in the furnace roof allows observation, alloying, slag addition, sampling and temperature measurement. The furnace roof was mated to the body of the furnace through a sand seal.

A DC power supply was used to provide the plasma energy. The maximum current was 500 A and the open circuit voltage is 75 V. Suitable plasma operation was possible from about 3.5 to 12 kW. The power delivered at a given setting was virtually independent of electrode to slag layer spacing. Rather, the voltage and current vary to compensate for the changes in arc resistance. Thus, an increase in the plasma length results in a decreasing current and an increase in voltage with any given power setting.

Arc voltages and currents were continuously monitored during DC plasma operation. Voltage was measured directly across the supply terminal, while current was measured indirectly by voltage drop across a shunt resistor in the supply line.

Desulphurization studies using the above apparatus were conducted with type 304L stainless steel and type 304 stainless steel alloyed with 4% C. The composition of these is given in Table 1. Slag of the composition of Table 2 was added to the steel. The melt size was 5 kg with 500 g of added slag. During the process, pin samples were taken periodically with 3 mm I.D. quartz tubes. The induction supply was momentarily set at a maximum power during sampling, in order to expose an area of slag-free, convex melt surface. Taking samples from this area minimize contamination of the pins.

TABLE I

STEEL COMPOSITION

| Steel Type | Cr | Ni | Mn | Si | P | Al | Mo | Cu | Sn | C | Fe |
|---|---|---|---|---|---|---|---|---|---|---|---|
| Type 304L stainless steel | 18.5 | 10.1 | 1.11 | .36 | .028 | .02 | .22 | .20 | .01 | .027 | Bal |
| Type 304-4% C stainless steel | 17.7 | 9.7 | 1.07 | .35 | .028 | .02 | .21 | .19 | .01 | .40 | Bal |

TABLE 2

SLAG COMPOSITION

| CaO | $Al_2O_3$ | MgO | FeO | $P_2O_5$ | $SiO_2$ | S |
|---|---|---|---|---|---|---|
| 46.6 | 46.46 | 1.9 | 0.9 | .34 | 3.4 | .22 |

Figure 2:
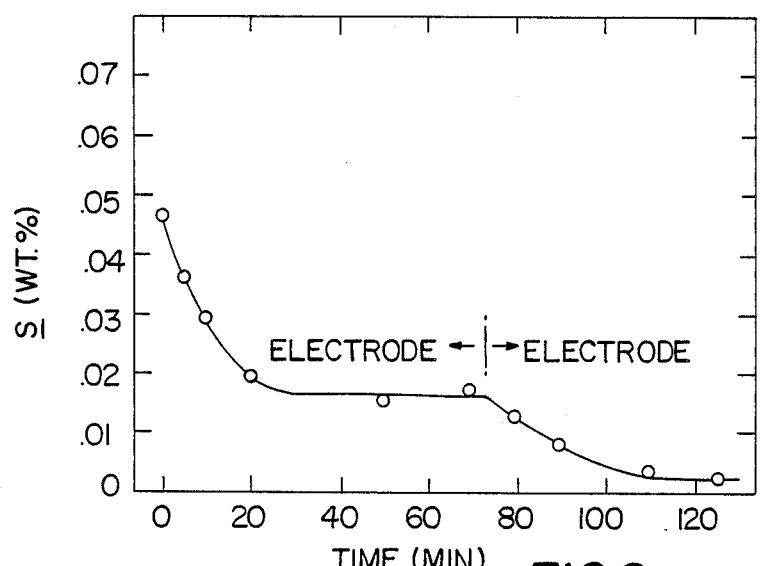
FIG. 2 is a graph of sulphur content of liquid metal versus time for type 304L stainless steel.

With type 304L stainless steel, the electrode polarity was negative for the first 73 minutes of application, then positive for the duration of the experiment. The temperature was 1450° C. As can be seen in FIG. 2, the equilibrium sulphur level was reduced from 180 ppm to 30 ppm upon switching the electrode polarity to positive. Thus, the use of a positive polarity electrode increased the equilibrium sulphur removal from the steel by a significant amount.

Figure 3:
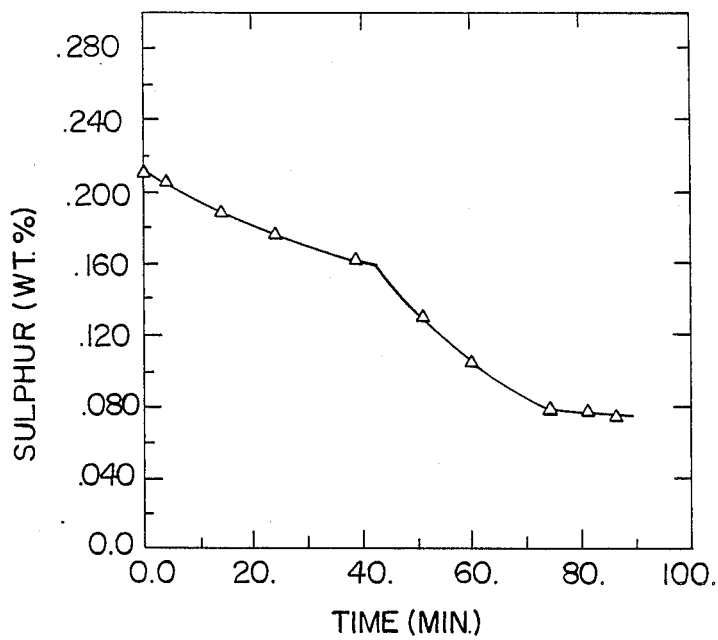
FIG. 3 is a graph of sulphur content of liquid metal versus time for type 304-4% C stainless steel.

Type 304 stainless steel alloyed with 4% C was then tested under the same conditions. For the first 42 minutes, a negative polarity was applied and from 42–75 minutes after starting, a positive polarity was applied. From 75 minutes on, a negative polarity was re-applied. As can be seen in FIG. 3, the drop in sulphur content of the liquid metal is dramatically increased when a positive polarity is applied.

Figure 4:
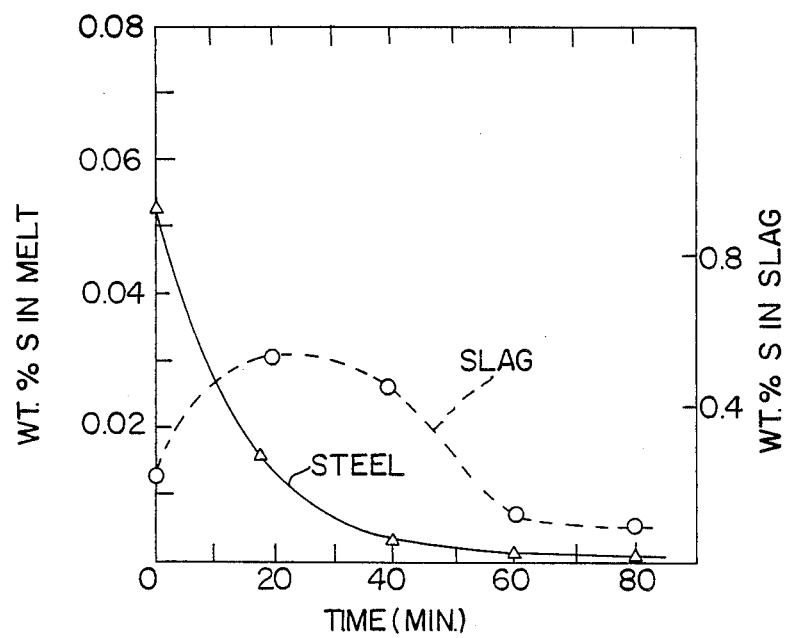
FIG. 4 is a graph of (i) sulphur content of the liquid metal versus time and (ii) sulphur content of the slag versus time.

Finally, the extent of sulphur removal was examined and is shown in FIG. 4. After 80 minutes, the sulphur content of the steel is reduced to zero. The sulphur content of the slag is also reduced to less than 0.01 wt % after 80 minutes.

EXAMPLE 2

The apparatus of Example 1, 5 kg of 304L stainless steel and 500 g of the slag of Example 1 (see Table 2) were used. The slag and metal were maintained at an average temperature of 1450° C. and a 5.5 kw positive polarity D.C. plasma was applied to the slag surface. After 140 minutes of treatment, the slag composition was determined and is denoted as A in the following table:

| Slag | CaO | $Al_2O_3$ | MgO | $Cr_2O_3$ | FeO | MnO | $SiO_3$ | S |
|---|---|---|---|---|---|---|---|---|
| A | 44.1 | 43.8 | 9.10 | 0.50 | 0.25 | 0.20 | 1.87 | 0.56 |
| B | 41.1 | 40.3 | 5.10 | 5.35 | 1.47 | 2.78 | 3.36 | 0.97 |
| C | 42.5 | 42.0 | 8.10 | 2.25 | 1.14 | 0.99 | 2.52 | 0.73 |

The polarity of the plasma was then reversed to negative, and a further treatment of 135 minutes was carried out in this fashion. The resulting slag composition was determined and is represented by B. The increase of the oxides of iron, manganese, silicon and chromium were noted, presumably oxidized from the melt. The polarity was again reversed, so the applied plasma was positive. After a further treatment of 65 minutes, the composition of the slag was determined and is denoted by C. The decrease of the fraction of reducible oxides was observed, notably oxides of iron, manganese, silicon and chromium. The metallic components of the oxides were alloyed into the steel by reduction at the slag/metal interface.

EXAMPLE 3

The apparatus of Example 1 is used, and 5 kg of 304L stainless steel and 500 g of slag of the above composition (see Table 2) are used. 30 g of chromium oxide is added to the slag. The slag is maintained at a temperature of 1450° C. and a positive polarity of 10 kW DC plasma is applied to the slag surface. The chromium dioxide migrates towards and is reduced to chromium at the interface between the slag layer and the molten steel and migrates into the molten steel to alloy the steel.

EXAMPLE 4

The apparatus of Example 1 is used, and 2 kg of iron are used with 500 g of the slag of the above composition (see Table 2). The slag and metal are maintained at an average temperature of 1500° C. and a negative polarity of 10 kw D.C. plasma is applied to the slag surface. 5 kg of an ore containing 30% NiO and 40% $Cr_2O_3$ is added to the slag with enough carbon to reduce the NiO. The amount of carbon used should be such that (i) significant amounts of the carbon are not solubilized in the metal, and (ii) reduction of $Cr_2O_3$ does not occur. After sufficient treatment time, the metal and slag phases are removed. The metal phase is now ferro-nickel and the slag phase contains $Cr_2O_3$.

A further 2 kg of iron are melted in the furnace and the slag phase previously removed is added back into the furnace. An average temperature of 1500° C. is maintained and a positive polarity of 10 kw D.C. plasma is applied to the slag surface. Although not essential, the addition of some reductant such as carbon can hasten the reduction of $Cr_2O_3$ from the slag phase, but carbon is not added in an amount sufficient to carburize the metal excessively. A low carbon ferro-chromium product can thus be obtained. This sequential reduction procedure can thus produce low carbon ferro-nickel and low carbon ferro-chromium from the same ore in two steps.

EXAMPLE 5

The apparatus of Example 1 is used. An iron carbon alloy is melted in the furnace and waste oxides comprising AOD dust, electric furnace baghouse dust or similar wastes are added continuously or intermittently to form a slag phase. 10 kw of positive polarity D.C. plasma is then applied to the slag phase. The metal phase accumulates as oxides of iron, manganese, chromium and nickel are reduced and the elements alloyed to the metal. The slag phase is fumed of impurities such as zinc, lead cadmium and their oxides. The resulting slag is non-toxic, non-leachable, and can be buried as landfill. The resulting metal can be recycled to recover valuable metallic units. The resulting fumes are collected in a fume system and disposed of appropriately as is known in the art, or are condensed to saleable product.

EXAMPLE 6

The apparatus of Example 1 is used. A copper or copper alloy melt is used as the metal and a basic oxide slag containing calcium fluoride is used as the ionic melt layer. Some calcium may be present in the slag as dissolved metallic calcium. A 10 kw positive polarity D.C. plasma is applied to the surface of the slag layer. Group V impurities such as Bi, As, Sb are reduced at the slag/metal interface, and combined with metallic or ionic calcium to form components such as $Ca_3As_2$ or ionic forms of these compounds such that $P^{3-}$, $Bi^{3-}$, $As^{3-}$, and $Sb^{3-}$ are present in the slag phase. This is aided by the polarization of the slag due to the applied D.C. polarity.

EXAMPLE 7

The apparatus of Example 1 is used. An impure nickel melted from scrap nickel sources, such as used catalysts, is used with an ionic melt layer comprising oxides. Purification to remove oxygen and sulphur is carried out as in Example 1 for steel.

Various modes of carrying out the invention are contemplated as being within the scope of the following claims particularly pointing out and distinctly claiming the subject matter which is regarded as the invention.

We claim:

1. A process for treating metal, comprising the steps of applying a positive DC potential to a slag layer disposed on the surface of a liquid metal melt to provide a plasma phase above the slag layer and induce a flow of electrons from the melt through the slag layer toward the plasma phase, and introducing to the plasma phase a substance capable of reacting with the species being released at the slag layer/plasma phase interface.

2. The process of claim 1, wherein the step of applying a DC potential comprises the steps of spacing a first electrode above the slag layer and disposing a second electrode in contact with the melt, connecting said electrodes in an electric circuit, and applying said DC potential to said circuit.

3. The process of claim 2, and including the step of forming the first electrode with a longitudinal passage, and introducing an inert gas through said passage to the plasma phase.

4. The process of claim 3, wherein said gas is argon.

5. The process of claim 1, and including the step of adding a metal oxide to said slag layer, the metal of said metal oxide being the same as the metal of said melt, reducing said oxide to provide additional quantities of said metal and generate an ionic species of oxygen, adding the metal to the melt, and passing the ionic species of oxygen upwardly through said slag layer to the slag layer/plasma phase interface.

6. The method of claim 5, wherein the step of introducing a substance comprises the step of introducing a gas capable of reacting with said species of oxygen at the slag layer/plasma phase interface.

7. The process of claim 1, and including the step of adding a metal compound to said slag layer with said metal compound being composed of a second metal different from the metal of said melt, reducing said compound to release said second metal at said melt/slag interface and alloying said second metal with the metal of said melt.

8. The process of claim 7, wherein said metal compound is a metal oxide.

9. A process for refining a metal, comprising the steps of applying a positive DC potential to a slag layer disposed on the surface of a liquid metal melt containing reducible to provide a plasma phase above the slag layer and induce the flow of electrons from the melt through the slag layer towards the plasma phase to thereby reduce said impurities, passing said impurities upwardly through said slag layer to the slag/plasma interface, and introducing to the plasma phase a substance capable of reacting with said impurities being released at the slag/plasma interface.

10. A process for treating metal, comprising the steps of applying a positive DC potential to a slag layer disposed on the surface of a liquid metal melt to provide a plasma phase above the slag layer and induce a flow of electrons from the melt through the slag layer toward the plasma phase, adding a metal oxide to said slag layer, said metal oxide being reduced to release the metal from said and produce an ionic species of oxygen, adding the released metal to the melt, and passing the ionic species of oxygen upwardly through said slag layer to the slag layer/plasma phase interface.

11. The method of claim 10, and including the step of introducing a gas capable of reacting with said species of oxygen at the slag layer/plasma phase interface.

12. A process for treating metal, comprising the steps of applying a positive DC potential to a slag layer disposed on the surface of a liquid metal melt to provide a plasma phase above the slag layer and induce a flow of electrons from the melt through the slag layer toward the plasma phase, adding a metal compound to said slag layer with said metal compound being composed of a second metal different from the metal of said melt, reducing said compound to release said second metal at said melt/slag interface, and alloying said second metal with the metal of said melt.

13. The method of claim 12, wherein said compound is a metal oxide, and said method includes the step of producing a species of oxygen at the melt/slag interface, passing said species upwardly through said slag to the slag/plasma interface, and reacting said species of oxygen with a second species.

14. A method of treating a metal, comprising the steps of heating a quantity of metal to a temperature above the melting point thereof to produce a melt, providing a layer of slag on the upper surface of said melt, heating the slag by direct current plasma arc heating with the melt being anodic to a temperature above the melting point of said slag to provide a molten slag layer, thereafter reversing the polarity of said plasma arc heating with said melt being cathodic to provide a plasma phase above the slag layer and induce a flow of electrons from the liquid metal through the slag layer towards said plasma phase.

15. The method of claim 14, and including the step of introducing to the plasma phase a substance capable of reacting with a species being released at the slag-plasma interface.

* * * * *

UNITED STATES PATENT AND TRADEMARK OFFICE
CERTIFICATE OF CORRECTION

PATENT NO. : 4,940,486

DATED : July 10, 1990

INVENTOR(S) : IAIN D. SOMMERVILLE ET AL

It is certified that error appears in the above-identified patent and that said Letters Patent is hereby corrected as shown below:

Col. 9, line 66, claim 1, after "phrase", first occurrence, insert --and, release an ionic species at the slag layer/plasma phase interface--; Col. 10, Line 36, CLAIM 9, After "reducible" insert --impurities--; Col. 10, Line 51, CLAIM 10, After "said" insert --oxide--

Signed and Sealed this

Tenth Day of March, 1992

Attest:

HARRY F. MANBECK, JR.

Attesting Officer

Commissioner of Patents and Trademarks